United States Patent [19]
Ward

[11] Patent Number: 5,305,512
[45] Date of Patent: Apr. 26, 1994

[54] METHOD OF MAKING A SPECIALTY-TRUCK CONVERSION VAN

[76] Inventor: Jeffrey Ward, 3320 Wall Blvd. 11-102, Gretna, La. 70056

[21] Appl. No.: 67,039

[22] Filed: May 21, 1993

Related U.S. Application Data

[62] Division of Ser. No. 959,787, Oct. 13, 1992.

[51] Int. Cl.⁵ .................... B23P 17/04; B60J 7/10; B60R 13/01
[52] U.S. Cl. .................... 29/401.1; 29/416; 29/897.2; 296/39.1; 296/183
[58] Field of Search .......... 29/401.1, 402.09, 412, 29/415, 897.1, 897.2, 416; 296/10, 39.1, 39.2, 183

[56] References Cited

U.S. PATENT DOCUMENTS

| | | | |
|---|---|---|---|
| 2,591,380 | 4/1952 | Schreiner | 296/183 |
| 4,315,653 | 2/1982 | Sparling | 29/401.1 X |
| 4,569,554 | 2/1986 | Dodgen | 296/183 X |
| 4,599,780 | 7/1986 | Rohrbacher | 29/401.1 |
| 4,738,480 | 4/1988 | Ward | 296/37.6 X |
| 4,765,671 | 8/1988 | Allen | 296/39.2 |
| 5,000,501 | 3/1991 | Cunha | 29/401.1 X |
| 5,154,478 | 10/1992 | Erickson et al. | 296/39.2 |

OTHER PUBLICATIONS

Autobody, Jan. 1928, p. 24.
Automotive Magazine, Feb. 6, 1984, p. 78.

*Primary Examiner*—Timothy V. Eley
*Assistant Examiner*—S. Thomas Hughes
*Attorney, Agent, or Firm*—Milton S. Gerstein

[57] ABSTRACT

A method of producing a truck-like conversion van starts with a conventional, cargo van, and vertically cuts the conventional van only partially along a vertical section of the main frame of the vehicle, just rearwardly of the side doors of the van. Thereafter, a horizontal cut is made starting from the bottom of the vertical cut and progressing rearwardly all the way through the frame or existing floor of the van. Thus a rectangular-shaped slab or cutout of the conventional van is removed. The horizontal plane in which the horizontal cut is made is above the top of the rear tail lights, so that, not only are all of the mechanical parts of the original van retained, but also the same, original tail lights are also retained. After the slab has been cut away and removed, a truck-bed liner-insert of the invention is inserted into the cutaway, rear portion of the van, which rear portion is partially hollow, by which the liner-insert may be received therein. The truck-bed liner-insert is shaped in order to simulate the bed of a conventional pick-up truck, whereby the conversion van may now take the shape of a specialty truck-conversion van having a rear truck-bed for storage and transport.

4 Claims, 3 Drawing Sheets

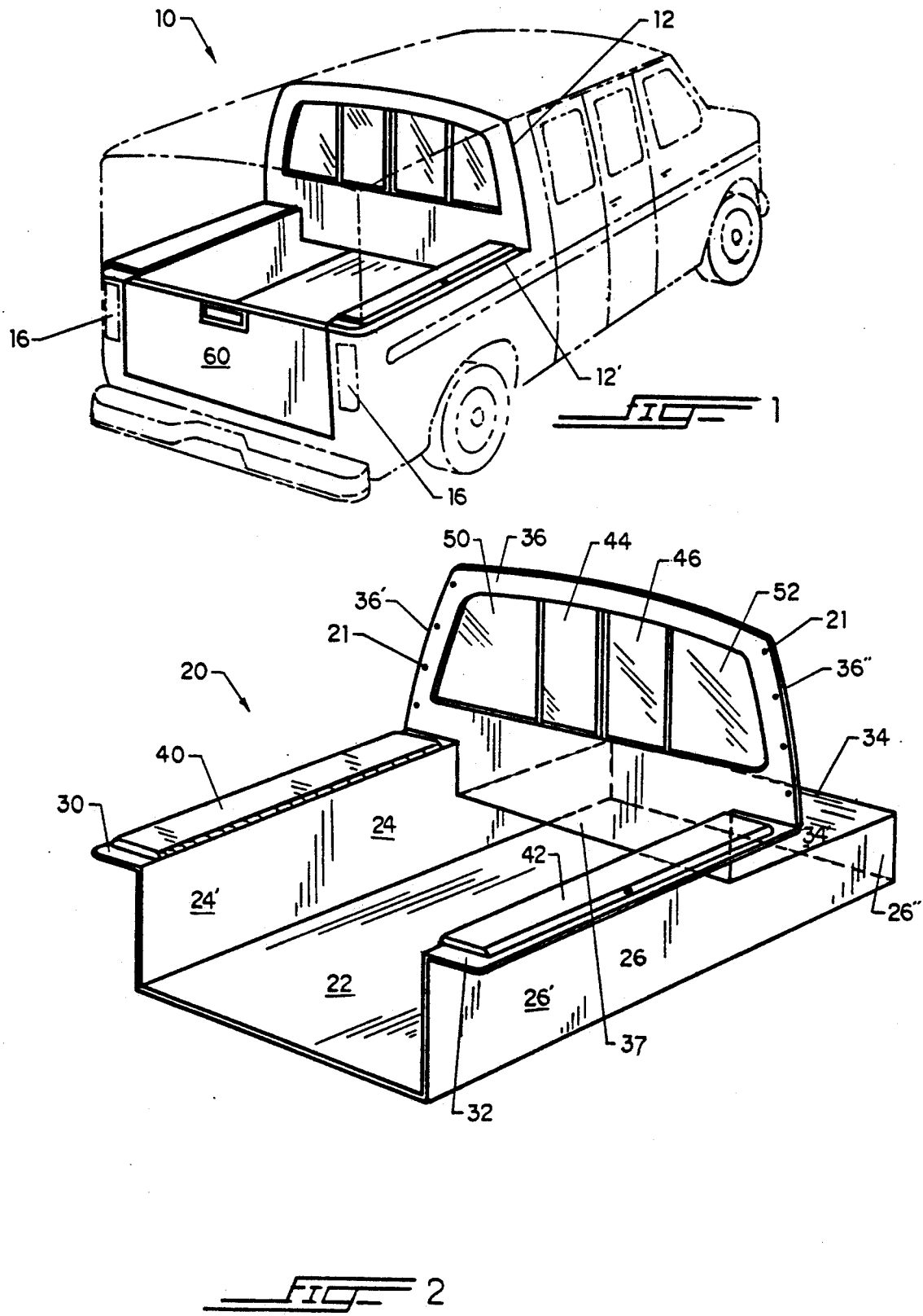

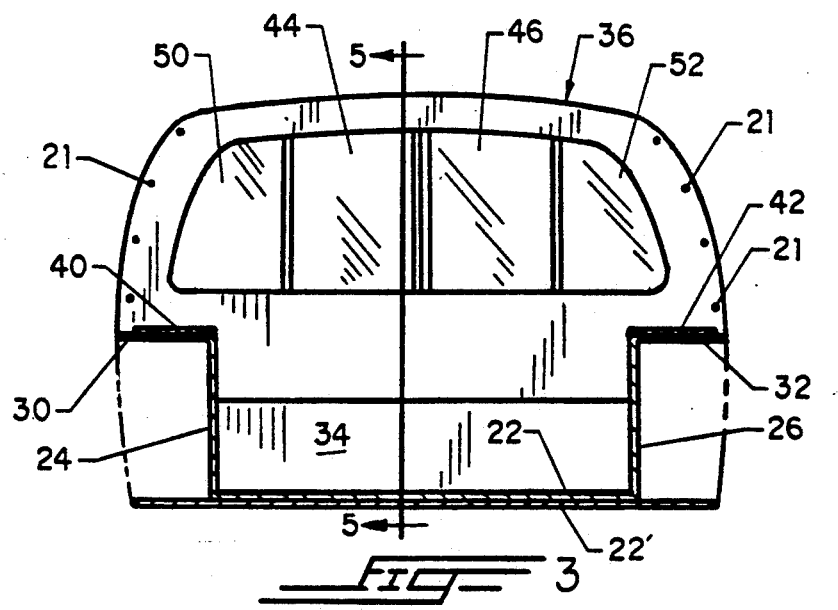
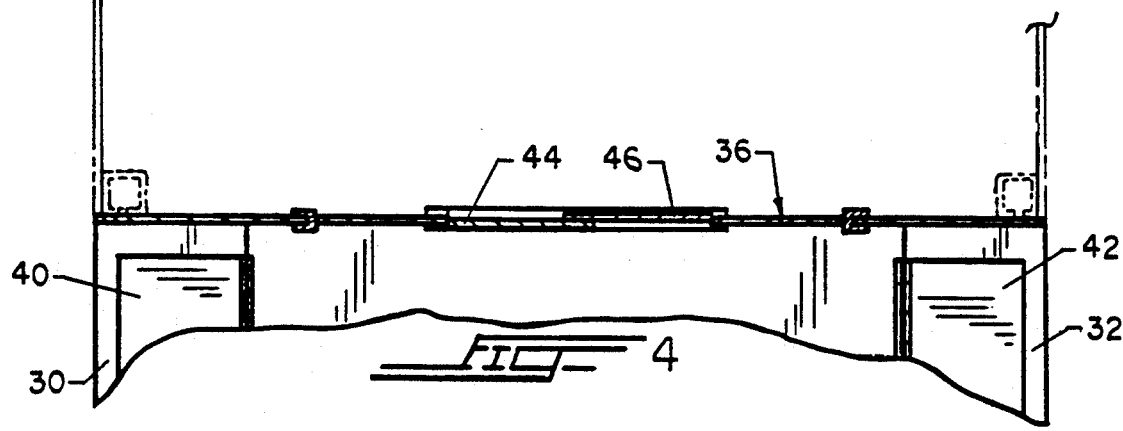
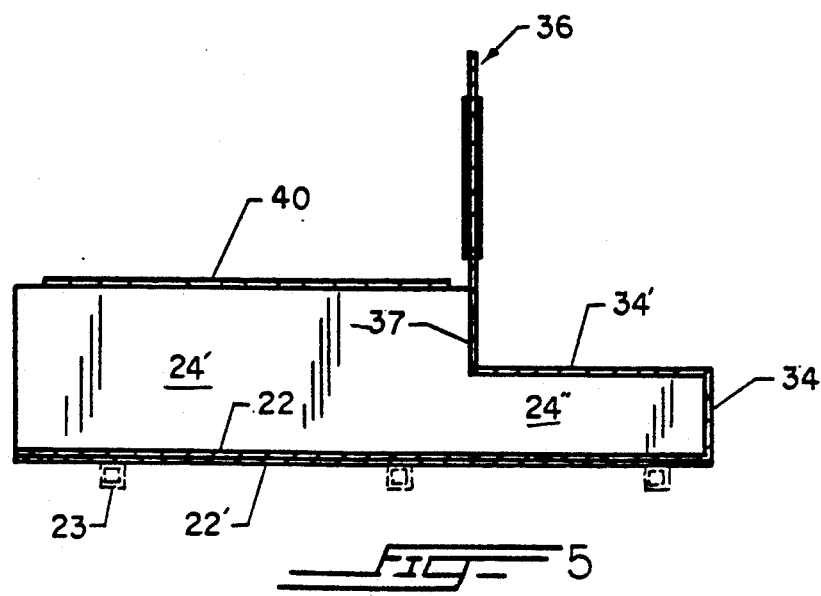

METHOD OF MAKING A SPECIALTY-TRUCK CONVERSION VAN

This is a continuation of co-pending application Ser. No. 07/959,787 filed on Oct. 13, 1992.

BACKGROUND OF THE INVENTION

The present invention is directed to a conversion van in the form of a pick-up truck-like vehicle. Such a vehicle is presently produced by Centurion Vehicles, Inc., of White Pigeon, Mich. This prior-art, truck-like conversion van is produced by starting with a conventional cargo van, or the like, and vertically, completely cutting that conventional van into two separate halves: A forward half-section, and a rear half-section. The vertical cut is made just rearwardly of the side doors of the van. The front section is retained, and the rear section is discarded, or recycled for other uses. Thereafter, a new rear section is welded to the front section, which new rear section is in the form of a pick-up truck bed.

SUMMARY OF THE INVENTION

It is the primary objective of the present invention to provide a conversion van in the form of a pick-up truck-like vehicle which is produced in a manner that retains more of the original van than that of the prior-art conversion van, thus reducing costs and labor time.

It is another objective of the present invention to provide such a conversion van having a rear truck-bed that utilizes the same main frame and tail lights of the original van.

Toward these and other ends, the method of the invention for producing a truck-like conversion van starts with a conventional, cargo van, or the like, and vertically cuts that conventional van only partially along a vertical section of the main frame of the vehicle, just rearwardly of the side doors of the van. Thereafter, a horizontal cut is made starting from the bottom of the vertical cut and progressing rearwardly all the way through the frame of the van. Thus, a rectangular-shaped slab or cutout of the conventional van is removed. The horizontal plane in which the horizontal cut is made is above the top of the rear tail lights, so that, not only are all of the mechanical parts of the original van retained, such as wheels, brakes, etc., but also the same, original tail lights are also retained. The rectangularly-shaped slap, or cutout, may be discarded, recycled for other uses, or, according to the preferred embodiment of the invention, may be re-used to cover the truck-bed of the conversion van. To allow for such re-covering of the bed, the original slab is fitted with conventional clamps for securing the slab onto the rim of the rear of the van. After the slab has been cut away and removed, a truck-bed liner-insert of the invention is inserted into the cut-away, rear portion of the van, which rear portion is partially hollow, by which the liner-insert may be received therein. The truck-bed liner-insert is preferably made of fiberglass, and is shaped in order to simulate the bed of a conventional pick-up truck, whereby the conversion van may now take shape of a specialty truck-conversion van having a rear truck-bed for storage and transport.

BRIEF DESCRIPTION OF THE DRAWINGS

The invention will be more readily understood with reference to the accompanying drawing, wherein:

FIG. 1 is a perspective view of the specialty truck-conversion van of the invention after a conventional van has been cut according to the method of the invention;

FIG. 2 is a perspective view of the truck-bed liner-insert that is inserted into a conventional van after it has been cut according to the method of the invention;

FIG. 3 is a rear view, in partial cross section, of the truck-bed liner-insert of FIG. 2;

FIG. 4 is a top view, in partial cross section, of the truck-bed liner-insert of FIG. 2;

FIG. 5 is a cross-sectional view taken along line 5—5 of FIG. 3; and

DETAILED DESCRIPTION OF THE INVENTION

Figure 6:
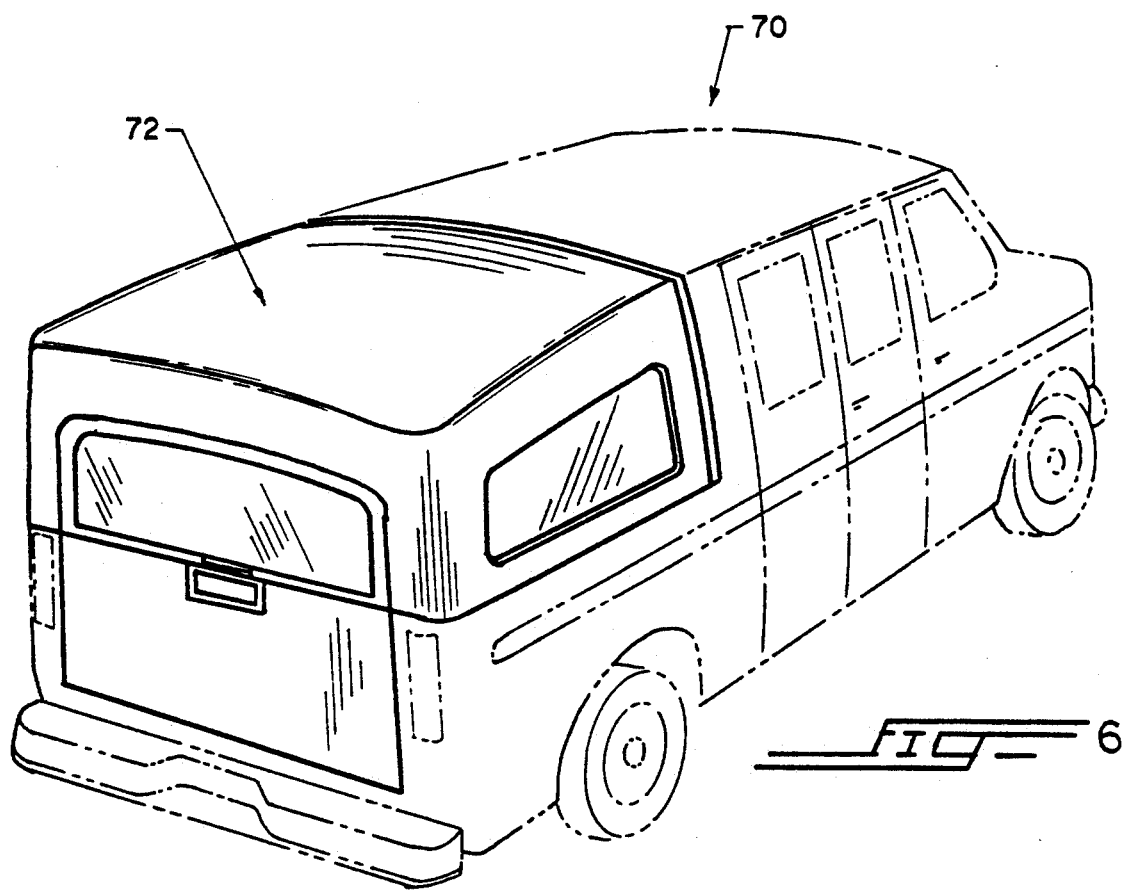
FIG. 6 is a perspective view showing a modification of the specialty truck-conversion van of the invention, in which a removable rear dome is provided, which rear dome is made from the same section of the original frame of the van that had been cut away during the method of the invention of converting a conventional van to that of a specialty truck-conversion van.

Referring now to the drawing in greater detail, the specialty truck-conversion van of the invention is indicated generally by reference numeral 10. According to the method of producing the specialty truck-conversion van 10, an original, conventional van, such as a cargo van, is provided, as shown in dotted lines in FIG. 1. This convention van is partially, vertically cut starting from the roof downwardly, just rearwardly of the side doors, at a location indicated by reference numeral 12. The vertical cut progresses for about half of the vertical height of the van, to a horizontal plane that lies slightly above the top of the tail lights 16. Thereafter, starting from the bottom of the vertical cut that was made, a rearwardly-directed horizontal cut is made all the way to and through the rear end of the van, just above the two tail lights, until an entire, rectangular-shaped slab-section or cutout is cut away and removed from the van, thus exposing a partially-hollow well, or interior volume, above the drive axle, wheels, etc. The hollow well has exposed therein the transverse support beams of the frame proper of the original, conventional van, with the wheels, axle, brakes, and the like, being positioned therebelow.

After an original, conventional van has been cut as above-described, a one-piece, integrally-formed truck-bed liner-insert 20, as shown in FIGS. 2-5, is then inserted into the rear, exposed, hollow well. The truck-bed liner-insert 20 has a lower, supporting floor-section 22, a pair of vertical side walls 24, 26, a pair of overhangs, or mounting flanges, 30, 32, a front wall 34, and an intermediate, vertical window-section 36. The width of the liner-insert, as measured between the outer surfaces of the two side walls 24, 26, is less than the width of the hollow well of the cut-away van's rear section, so that the liner-insert may be received, or dropped, within the well, with the supporting floor-section 22 being supported on a board or platform 22' (seen in FIGS. 3 and 5), which platform 22' is placed directly on the transverse frame-beams on existing van floor 23 seen in FIG. 5. The overhangs 30, 32 overhang the exposed, upper edge-surfaces or rim of the portion of the rear frame of the conventional frame which had been cut, as above-described. Each overhang section 30, 32 is provided with a rectangular-shaped opening extending most of the length, which opening is covered by hinged covers 40, 42. These covers 40, 42 are used for accessing the side-volumes directly below the overhangs 30, 32, which side volumes are bounded by a respective side wall 24, 26, a respective outside surface of the van proper juxtapositioned opposite to the respective side wall 24, 26, and, on the bottom, by a plank or board placed on the transverse beams 23, which may be the same board, or platform, 22'. These side-volumes define wheel-storage spaces for tools, or just for extra storage space. Each of the side walls 24, 26 has a rear section 24', 26' that is of greater height than the forward section 24", 26".

The window-section 36 is located at the forward-end edge-surfaces of the overhangs 30, 32, between the two sections of the side walls, and has a width and height that closes off the opening formed when the original, conventional van was cut according to the method of the invention. The window-section 36 has a pair of sloping, curved side edges 36', 36" that conform to the general shape of the side of the original conventional van that was cut. The window-section 36 is affixed to the annular rim of the frame left remaining after the cut that was made according to the method of the invention. The window-section 36 is affixed by means of rivets, or bolts, passing through holes 21 formed in the outer edges of the window-section. A downwardly-projecting section 37 of the window-section 36 protrudes into the interior of the liner-insert 20 at the connection of the sections 24', 26' with the respective sections 24", 26". The forward section of the liner-insert 20, defined by the lower-height forward sections 24", 26" and forward wall 34, projects into the cab-interior and under the rear bench-seat thereof, in order to provide a greater, working volume for storing and transporting articles via the truck-bed liner-insert 20, with a longer article having a forward portion extending below and past the window-section's downwardly-projecting section 37 for storage in the forward section of the liner-insert positioned under the rear bench-seat. Preferably, though not a prerequisite, the forward section under the seat may be covered with a top wall 34'. The window-section 36 is provided with a pair of conventional, slidably-movable, clear panels 44, 46 and two, fixed, clear end-panels 50, 52.

As can be seen in FIG. 1, a conventional, rear gate or door 60 is provided. The door 60 replaces the original doors of the original, conventional van that was cut, which door 60 swings out and down in a conventional manner. It is, of course, possible to modify the original pair of swing-out doors that had been cut in two by the original cut, in order to make a single door similar to the door 60.

FIG. 6 shows a modification 70 in which the rear truck-bed of the van with the liner-insert therein has been covered over by a dome 72. The dome 72 is, in fact, the very same slab, or cutout, that was removed when the original, conventional van was cut. The only modification to the original slab that was cut away from the original, conventional van is that the dome, or cover, 72 is provided with conventional clamps (not shown) for removably clamping it to the upper rim 12' of the rear of the van (see FIG. 1). The dome 72, thus, acts as a protector to the storage space of the truck-bed defined by the liner-insert of the invention.

While a specific embodiment of the invention has been shown and described, it is to be understood that numerous changes and modifications may be made therein without departing from the scope, spirit and intent of the invention as set forth in the appended claims.

What I claim is:

1. A method of making a specialty truck-conversion van from a conventional van having a frame with frame-beams, a roof, a side door-entrance, and rear tail lights, comprising:
   (a) vertically-downwardly, partially cutting a conventional van along a vertical plane from the roof thereof that is rearward of the side door-entrance of the conventional van;
   (b) said step (a) comprising vertically cutting to a horizontal plane below the roof, which horizontal plane lies above the tops of the rear tail lights of the conventional van;
   (c) horizontally cutting along said horizontal plane to form a cut extending from the rear end of said conventional van up to said vertical plane;
   (d) removing from the conventional van a slab cut out from the conventional van by said steps (a) and (b);
   (e) said step (d) comprising exposing a well-portion in the rear of the conventional van bounded from below by frame-beams of the frame of the conventional van; and
   (f) placing a linear-insert into the well-portion for forming a pick-up truck-bed.

2. The method according to claim 1, wherein said liner-insert comprises a bottom wall having a front edge, a rear edge, and side edges; a pair of side walls projecting upwardly from said bottom wall; each of said pair of side walls comprising a first, rear section of a first height, and a second, front section of a second height less than said first height; a pair of overhang-members projecting from said side walls, one said overhang-member for one said side wall; and a transverse window-section projecting upwardly from said pair of side walls, said window-section traversing across and above the width of said bottom wall, wherein said step (f) comprises:
   overhanging said overhang-members over respective, oppositely-disposed portions of the upper rim of the well-portion, and inserting a support-board between the bottom wall of said liner-insert and said frame-beams, whereby said liner-insert is supported.

3. The method according to claim 2, wherein said step (f) further comprises fixedly connecting said window-section to a rearwardly-facing frame-rim exposed during said steps (a) and (b), said frame-rim projecting upwardly from the forward end portion of said well-portion, for forming a front cab-section that is divided from said rear well-portion.

4. The method according to claim 1, wherein said step (f) further comprises spacing side walls of said liner-insert from the exterior walls of the conversion van juxtapositioned thereat, said step of spacing forming side-volumes for storage, which side-volumes are accessible from above by covers provided in said liner-insert.

* * * * *